(12) United States Patent
Kraus

(10) Patent No.: US 7,429,124 B2
(45) Date of Patent: Sep. 30, 2008

(54) DEVICE FOR TURNING OVER AND BACK-MIXING MOIST MATERIAL

(75) Inventor: Karl Kraus, Ühlingen-Birkendorf (DE)

(73) Assignee: Hans Huber AG Maschinen-und Anlagenbau, Berching (DE)

( * ) Notice: Subject to any disclaimer, the term of this patent is extended or adjusted under 35 U.S.C. 154(b) by 361 days.

(21) Appl. No.: 11/194,132

(22) Filed: Jul. 29, 2005

(65) Prior Publication Data

US 2006/0050609 A1 Mar. 9, 2006

(30) Foreign Application Priority Data

Jul. 30, 2004 (DE) .................. 10 2004 037 209

(51) Int. Cl.
*B01F 7/04* (2006.01)
*C02F 11/12* (2006.01)
*C05F 17/02* (2006.01)
*E02F 3/92* (2006.01)
*F26B 25/04* (2006.01)

(52) U.S. Cl. ...................................... 366/346
(58) Field of Classification Search ................. 366/346, 366/345
See application file for complete search history.

(56) References Cited

U.S. PATENT DOCUMENTS

| 142,946 | A | * | 9/1873 | Schuff | 366/346 |
|---|---|---|---|---|---|
| 223,086 | A | * | 12/1879 | Weinig | 366/346 |
| 505,945 | A | * | 10/1893 | Hochmuth | 366/346 |
| 580,840 | A | * | 4/1897 | Barber | 366/346 |
| 673,835 | A | * | 5/1901 | Franzl et al. | 366/346 |
| 722,785 | A | * | 3/1903 | Weschler | 366/346 |
| 740,770 | A | * | 10/1903 | Mueller | 366/346 |
| 748,875 | A | * | 1/1904 | Mueller | 366/346 |
| 829,307 | A | * | 8/1906 | Weinbeer | 366/346 |
| 1,345,521 | A | * | 7/1920 | Wadsworth | 366/346 |
| 4,377,258 | A | * | 3/1983 | Kipp, Jr. | 241/27 |
| 4,478,520 | A | * | 10/1984 | Cobey | 366/345 |
| 5,065,528 | A | | 11/1991 | Kaneko et al. | |
| 5,348,103 | A | * | 9/1994 | Chiddicks et al. | 172/45 |
| 5,372,458 | A | | 12/1994 | Flemmer et al. | |
| 2004/0005698 | A1 | | 1/2004 | Chenu | |

FOREIGN PATENT DOCUMENTS

| DE | 4315321 | 11/1994 |
|---|---|---|
| DE | 19704201 | 10/1997 |
| DE | 198 36 268 | 2/2000 |
| DE | 20304220 U1 | 3/2003 |

(Continued)

OTHER PUBLICATIONS

German Search Report, 2 pages, May 2005.

(Continued)

*Primary Examiner*—Tony G Soohoo
(74) *Attorney, Agent, or Firm*—Dority & Manning, P.A.

(57) ABSTRACT

A turnover device is provided to turn over and back-mix moist material, in particular sewage sludge in moist or dry state in a dryer in which the moist material is spread out for drying on a floor in one layer. The turnover device is provided with at least one shovel that can be rotated within a circumference around an axis.

20 Claims, 2 Drawing Sheets

FOREIGN PATENT DOCUMENTS

| | | |
|---|---|---|
| DE | 10 2004 037 209.8 | 7/2004 |
| EP | 1150083 B1 | 6/2004 |
| EP | 05106526.6 | 7/2005 |
| EP | 1621522 A1 * | 2/2006 |
| JP | 04165287 | 11/1992 |

OTHER PUBLICATIONS

European Search Report, 3 pgs, Oct. 2005.
Article—Solar Sludge Drying-Based on the 1st Process, by Ulrich Luboschik, 1998 Published by Elsevier Science Ltd.

* cited by examiner

DEVICE FOR TURNING OVER AND BACK-MIXING MOIST MATERIAL

FIELD OF THE INVENTION

The present invention relates to a turnover device to turn over and back-mix moist material, in particular sewage sludge in moist or dry state in a dryer in which the moist material is spread out for drying on a floor in one layer. The turnover device is provided with at least one shovel that can be rotated within a circumference around an axis.

BACKGROUND OF THE INVENTION

DE 203 04 220 U1 discloses a device for the drying of sludge, whereby the sludge to be dried is spread out on a drying bed for solar drying. The device is provided with a tool bridge on which a plurality of sludge-treating tools are installed. The device is capable of moving over the drying bed for turning the sludge over and crumbling it. For this operation, the tool bridge is moved, e.g., on lateral running paths, extending next to the drying bed. In a further development the proposal is made to provide the tool bridge with a rake blade. The rake shield spreads out the previously dewatered sludge evenly on the drying bed and, upon completion of the drying process, pushes the dried sludge out of the bed. The next charge of material is then provided for drying. The tools installed on the tool bridge serve to mix through and crumble the sludge, but transportation through the drying installation is not possible by means of the tools. A continuous arrival and removal of material to be dried is therefore not possible.

DE 201 07 576 U1 discloses a device for the drying of moist material in which the moist material is spread out in a drying bed to be dried. Warm drying air is fed to the moist material via a blower arrangement. In an advantageous embodiment, a mixing and raking-out device for the mixing and transporting of the moist material is provided. The mixing or turning over makes uniform drying of the moist material possible as contact between all components of the material to be dried with the drying air is ensured. In addition, the mixing and raking-out device makes a further transportation of drying material through the installation possible during turnover. The drying material can be conveyed to and from the drying installation by conveyors. It is however a disadvantage with this mixing and raking device that conglomerates of moist material can form during the turn-over process, to be then deposited by the mixing device. During the following mixing process these conglomerates are taken up with great difficulty by the mixing apparatus because they are pushed ahead by the scoops of the mixing device or roll away from them. These conglomerates are thus not back-mixed into the moist material to be dried but are conveyed through the drying installation with still very high residual moisture content and are removed via the conveyor. Sufficient and even drying of the moist material can thus not be achieved.

It is the object of the present invention to avoid the above-described disadvantages and to create an apparatus by means of which a continuous arrival and removal of drying material as well as uniform drying throughout can be achieved.

SUMMARY OF THE INVENTION

Objects and advantages of the invention will be set forth in part in the following description, or may be obvious from the description, or may be learned through practice of the invention.

According to the invention, a turn-over device to turn over and back-mix moist material in a moist and dried state, in particular sewage sludge, is installed in a drying installation. The moist material is spread out for drying in one layer on a floor in the drying installation. The turn-over device is provided with at least one shovel that is rotatable within a circumference around an axis. Directly outside the circumference and above the layer of moist material a retaining device interacts with the shovel and makes it possible to pick up the moist material with special ease on the shovel, particularly conglomerates. The retaining device prevents conglomerates from being pushed ahead of the shovel and not entering the turn-over device. The transportation of still moist conglomerates through the drying installation and their removal is prevented. Thanks to the continuous transportation of the moist material while it is being turned over, a moisture gradient applies over the length of the drying bed. As a result, moist material can be arriving at one end of the installation while a throughout uniformly dried material is removed at the other end. In addition, the interaction of the retaining device and the shovel achieves especially good crumbling of the moist material and comminution of the conglomerates.

If a drive is assigned to the turn-over device the latter can be moved along the floor at a right angle to its axis. This allows for uniform treatment of the moist material over the entire length of the drying installation and, in coordination with the shovel's rotation, transportation of the moist material through the drying installation.

It is advantageous if the turn-over device is assigned a drive to change the distance between the circumference and the floor. The turn-over device can be adjusted thereby to a desired distance from the floor. With a great distance from the floor, the turn-over device can be lifted completely off the moist material and in this way through-mixing can be prevented, e.g., in case of an empty run or a return movement.

In a preferred embodiment of the invention, the distance of the retaining device from the floor and/or the layer of material can be changed by means of an adjusting device. The distance between the retaining device and the layer or the floor influences the quantity and the size of the conglomerates that can no longer be taken up on the shovel. In addition, the retaining device can be lifted off by the adjusting device from the layer to such a height that return travel or empty travel can take place without any problem.

If the retaining device is made in form of a screen it can also be used to level the layer. The screen is then stationary, but its level can be changed if necessary and it is installed on the turn-over device.

In another advantageous further development of the invention, the retaining device is made in form of a tab, e.g., made of a rubber-like material. With this inexpensive design the adjusting devices for the level adjustment of the retaining device can be omitted.

The tab may be stationary for this, or may be rotatable together with the shovel. If the tab is rotatable together with the shovel, this allows for an especially simple construction of the retention device.

Another exemplary embodiment of the invention provides for the retaining device to be capable of displacement along the circumference of the turnover device. This ensures a defined distance between scoop and retaining device and thereby an especially advantageous interaction.

Furthermore, it is advantageous if the turnover device is assigned a raking device in order to push the moist material out of the drying installation. In the same manner the raking device can be used to level the layer of moist material, e.g., for sanitizing purposes.

An especially economical and space-saving design is achieved if the raking device and the retention device are made as one and the same component.

In another advantageous further development of the invention, the raking device and/or the retention device is located before and/or behind the turnover device, as related to the direction of movement. If the retention device and the raking device are made as separate components, one component can be before and one after the turnover device. If they are made as one component and that component is located in front and after the turnover device, turning over and/or raking of the moist material in both directions of movement is possible.

A sensor is preferably assigned to the turnover device to detect the height of the layer and the height of the turnover device. The retention device as well as the raking device can be adjusted as a function of the height of the layer.

In an especially advantageous embodiment of the invention, the sensor is connected to a control system to determine an average height. The average layer height determines the height setting for the turnover and raking device as well as for the retention device.

It is also advantageous if the shovel is installed directly on a shaft. This allows for a simple and economic design.

It is especially advantageous if at least one shovel is provided in one segment and if several segments are installed in axial direction on a shaft. The individual segments are in this case welded or screwed to the shaft or connected in some other manner to the shaft. This type of construction rather than welding the shovels directly to the shaft ensures better accessibility in manufacture and facilitates the replacement of individual segments.

If the cross-section of the shovel is in form of a polygonal segment resembling a semi-circle, the production of the shovel is especially simple and economical, e.g. by welding together separate, straight sheet metal pieces or by canting off a metal plate.

In another advantageous embodiment of the invention, the shovel is located on a stanchion that extends radially relative to the circumference. This makes economic manufacture from simple basic elements, e.g. straight metal plates, as well as easy access during assembly possible. With a symmetrical arrangement of the shovels relative to the stanchion, turnover is possible during forward and reverse travel without no-load operation.

In another advantageous embodiment, the shovel extends parallel to the axis. Thereby an especially even transportation of the material through the drying installation is achieved.

In order to improve the force direction for the entry of the shovels into the moist material, several shovels can be arranged so as to be offset relative to each other in axial direction. The impacts on the bearings are thereby reduced and the life of a bearing is extended.

It is furthermore advantageous if the shovel can be stopped in a predetermined position. During the reverse travel of the turnover device, this ability to stop prevents an unwanted further mixing of the moist material. For the raking-out operation of the drying bed by the raking device, the shovel can be stopped in a horizontal position so as not to hinder the raking operation and to prevent damage. In stopped position, the shovel can however also be used to level the layer or to remove the moist material from the drying installation.

It has also been shown to be advantageous to provide the turnover device with a support wheel in the center. This additional support, in particular with wide turnover devices, prevents bending the shovel or the shaft. The level of the turnover device is thus constant over the entire width, and this ensures deep mixing to a uniform depth while preventing damage to shovel and installation.

According to an especially advantageous further development of the invention, a plow is associated with the support wheel. It frees a track for the support wheel in the layer of moist material and thus prevents blocking of the support wheel, e.g., due to an accumulation of drying material or a change in the height of operation of the turnover device, when the support wheel would ram up against the moist material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE INVENTION

Figure 1:
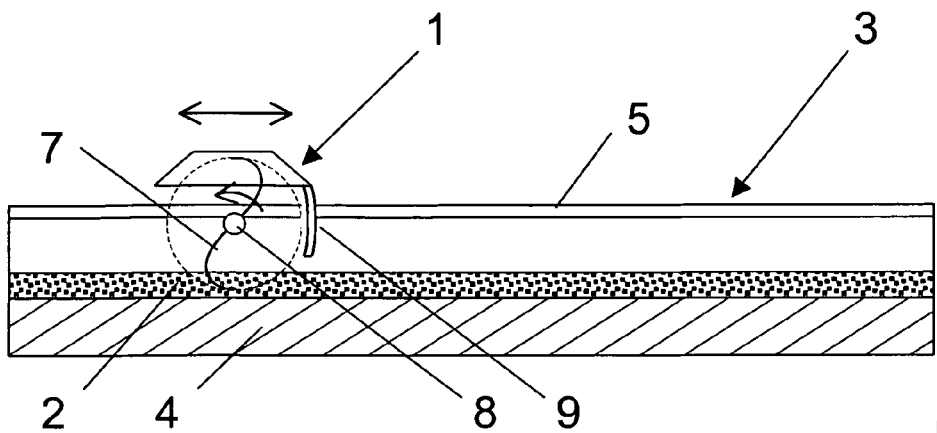
FIG. 1 is a schematic representation of an embodiment of a turnover device in a drying installation.

Reference will now be made in detail to embodiments of the present invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

FIG. 1 shows an exemplary embodiment of a turnover device 1 in a schematic representation. On the floor 4 of a drying installation 3, moist material 2 is spread out. The moist material 2 consists in particular of sewage slurry containing dry residuals. The moisture contained in the moist material 2 is removed to a great extent in the drying installation 3 by solar and/or thermal drying. In order to ensure uniform drying of the moist material 2, a turnover device 1 is provided. The turnover device 1 consists essentially of at least one shovel 7 rotatable around an axle 8, which turns the moist material 2 over and mixes it. The turnover device 1 is moved back and forth in the direction of the double arrow along a guide rail 5 while turning over and mixing the moist material 2. A retention device 9 is installed on the turnover device 1 so that conglomerates formed in the moist material may be picked up by the shovels 7.

In addition, the turnover device 1 prevents the moist material 2 from adhering to the floor 4 due to excessive drying. The moist material 2 is picked up in front of the turnover device 1 as it is being turned over and is deposited again behind it so that transportation of the moist material in the longitudinal direction through the drying installation takes place during turnover. If the rotation of the shovels 7 and the advance of the turnover device 1 are synchronized suitably, a moisture gradient applies in the longitudinal direction of the drying installation. As a result, it is possible to feed moist material 2 to the installation at one of its ends and the already dried material 2 can be removed at the other end of the installation. The moist material 2 can, however, also be turned over on the spot without continued transportation.

Figure 2:
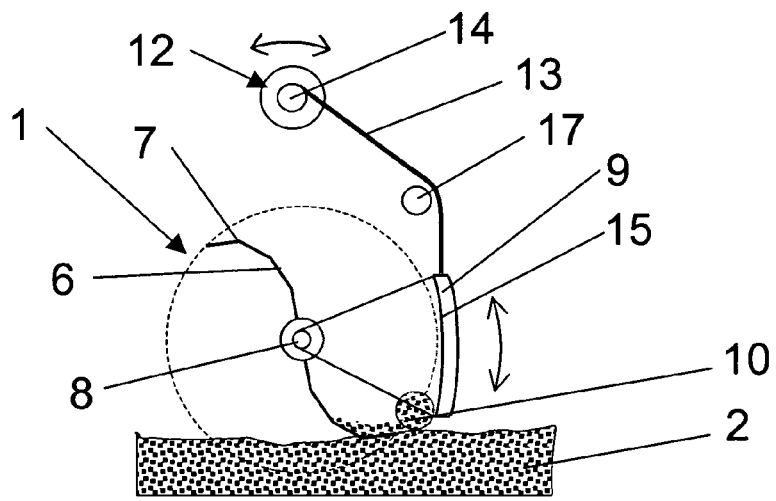
FIG. 2 shows the interaction of a retention device and shovel in an embodiment of the turnover device as well as an adjusting device to change the level of the retention device.

FIG. 2 shows the interaction of the retention device 9 and the shovel 7 as well as an adjusting device 12 to adjust the height of the retention device 9. The shovel 7 in this embodiment consists of individual metal plates 6 connected to each other by welding so that their cross-section is as a section of a polygon resembling a semi-circle. The shovel 7 can thus be produced in an especially simple and economical manner. The shovel 7 may, however, also be made in a different manner, e.g., by canting off a metal plate. Similarly, several shovels 7 or only one shovel can be installed around the axle 8.

If conglomerates 10 of moist material 2 are located in front of the shovel 7, these are pushed against the shovel 7 by the retention device 9, which is attached in a stationary manner to the turnover device 1. The conglomerates 10 can thus be picked up without difficulty, without rolling along in front of the shovel. Continued transportation of still moist conglomerates 10 in dryer zones of the drying bed and thereby renewed addition of moisture to already dry material 2 is prevented by the retention device 9. In addition the retention device 9, in interaction with the shovel 7, achieves improved comminution of the material 2.

In the exemplary embodiment shown in FIG. 2 the height of the retention device 9 can be adjusted by means of a adjusting device 12 so that the distance from the surface of the moist material 2 can be adjusted. This distance substantially determines the quantity and size of the conglomerates 10 fed to the turnover device 1. If the selected distance is short, only small conglomerates 10 can be pushed along in front of the turnover device 1 while larger conglomerates 10 get on the shovel 7 and are turned over and crumbled.

In the example, shown the retention device 9 can be displaced along the circumference of the turnover device 1. This produces a constant, defined distance between shovels 7 and retention device 9, ensuring an especially uniform mixing-through of the moist material 2 even at different level settings.

The adjusting device 12 in this case is made in form of a cable winch 14. The cables attached to the retention device 9 are wound via deflection rollers 17 on the winch 14 so that an adjustment of the level of the retention device 9 along the circumference of the turnover device 1 takes place. However other types of level adjustment, e.g. purely translatorial, are also possible.

If the distance between the retention device 9 and the layer of moist material 2 is very small, the retention device 9 can also be used to level the layer of moist material, e.g for hygienic reasons. For this purpose the shovels 7 are stopped in a suitable position. The stop is not shown here.

If the retention device 9 is made in form of a screen 15 as shown here, it can also be used as a raking device to rake off the drying bed, e.g., for cleaning purposes or to remove the moist material 2.

Figure 3:
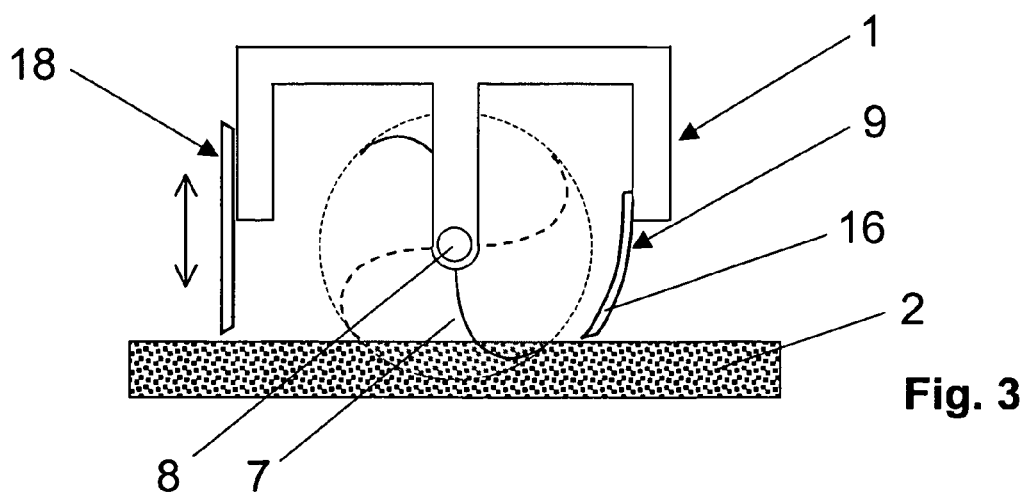
FIG. 3 is a detailed view of an embodiment of a turnover device with a raking device and a retention device.

FIG. 3 shows a detailed view of a turnover device 1 according to an embodiment of the invention, with a raking device 18 and a retention device 9. The retention device 9 in this embodiment is made in form of a rubber-like tab 16. The tab 16 bends and is taken along by the shovel 7. The end of the tab 16 is always in contact with the layer of material due to the advance of the turnover device 1. The special advantage of this design, in addition to economical manufacture and assembly, consists in the fact that expensive adjusting tasks regarding the height of the layer of material can be omitted. The tab 16 can be attached in a stationary manner to the turnover device 1. The tab 16 can, however, also be connected rotatably to the shovels 7; this makes especially simple construction possible. Gravity causes the tab 16 to fall by itself back in opposite direction to the rotation of the shovels 7 into the retention position. The retention device 9 is located before the turnover device 1, as seen in FIG. 3, in the direction of travel of the turnover device 1. In the shown embodiment a raking device 18 is assigned to the turnover device 1 and is located behind the turnover device 1, considering the direction of travel of the turnover device 1. However, the raking device 18 can also be installed parallel to the retention device 9 and in front of the turnover device 1. If the turnover device 1 is designed so that turning over the material is possible during forward and reverse travel, one retention device 9 is installed in front of and one after the turnover device 1. Similarly, the raking device 18 can be installed before and after the turnover device 1. The height of the raking device 18 is adjustable in relation to the layer of material, so that it can be used for leveling the layer as well as to push the moist material 2 out of the drying installation.

Figure 4:
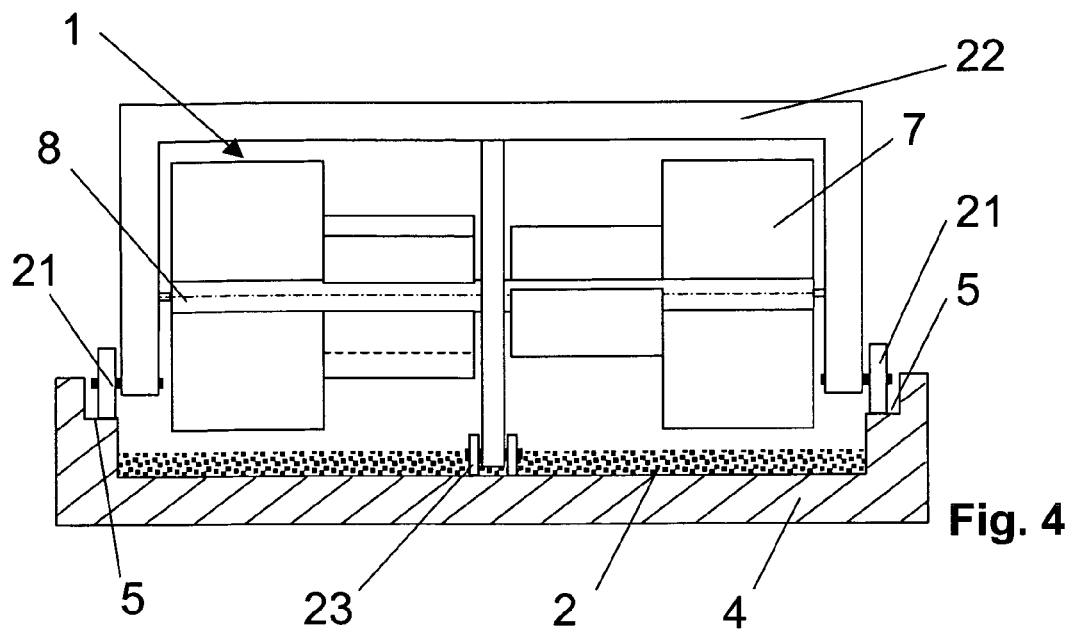
FIG. 4 shows an embodiment of a turnover device in portal design with a support wheel.

FIG. 4 shows a turnover device 1 according to an embodiment of the invention in portal construction with a support wheel 23. The entire turnover device 1 is attached to a portal 22, which can be moved on wheels 21 along a guide rail 5 over the entire length of the drying bed. The portal 22 can be massive or can be a framework construction and extends over the entire width of the drying bed. In the example shown the turnover device 1 is centered in the portal 22 and is supported on the floor 4 of the drying installation 3 on an additional support wheel 23. A plow, which is not shown here, can be installed before the support wheel 23 to keep the floor free and to prevent the wheel from being blocked. If such a plow is rotatable or is installed before and also behind the support wheel 23, the portal 22 with the turnover device 1 can easily be moved in both directions.

Figure 5:
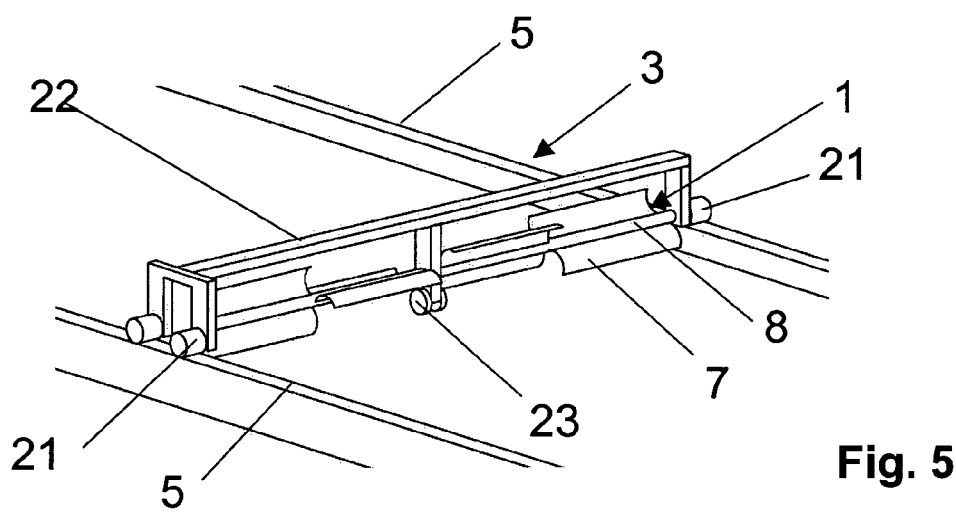
FIG. 5 shows a view in perspective an embodiment of a turnover device with several shovels offset relative to each other in axial direction.

FIG. 5 shows another turnover device 1 in perspective with several shovels 7 offset relative to each other in the axial direction. If the shovel 7 is made as one piece extending over the entire width of the turnover device 1, the shovel 7 dips into the moist material 2 suddenly during turnover and this results in an impact stress on the bearings. The offset arrangement of the shovels 7 ensures improved force transmission so that the stress on the bearings is reduced and their life is thus extended. This arrangement can be realized most advantageously in segmental construction. For this, only one shovel 7 or several shovels 7 can be prefabricated in one segment. The individual segments are then connected to the shaft, e.g., by welding or screws. The individual segment can in that case extend over the entire width of the turnover device 1 or take up only part of its width. In the example shown, several segments are radially offset relative to each other in the axial direction, one after the other. The segmented design facilitates fabrication and makes replacement of individual shovels 7 easier. Mounting the shovels 7 directly on the shaft is, however, also possible.

Figure 6:
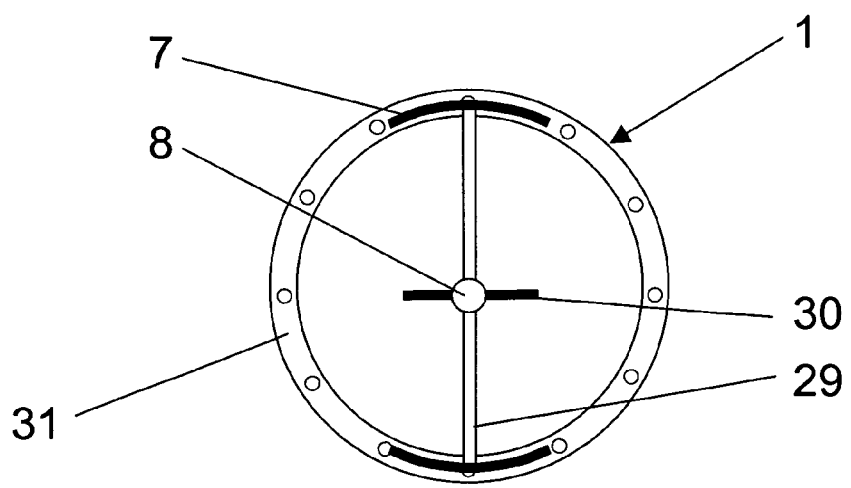
FIG. 6 shows a detailed view of an embodiment of a shovel as installed on a stanchion.

FIG. 6 shows the arrangement of the shovel 7 on a stanchion 29 extending radially relative to the circumference. The mostly symmetrical arrangement of the shovel 7 makes turning over and thorough mixing of the moist material 2 possible during forward and backward travel. Similarly a symmetrical arrangement of the shovel 7 on the stanchion 29 is also possible. In this embodiment, retention plates 30 installed in proximity of the axle prevent moist material 2 from falling back over the axle 8 as a result of gravity. In this embodiment, several shovels 7 can also be offset relative to each other in axial direction. The individual shovel elements can e.g. be connected to each other by means of a ring-shaped flange 31 and screws. Other types of connections are, however, also possible. Of course, a retention device 9 can also be assigned to this embodiment. A retention device 9 in form of a tab 16 can be attached most easily in this case, e.g., to the retention plates 30. However, the tabs 16 can also be attached to the shovels 7.

It will be appreciated by those skilled in the art that various modifications and variations can be made in the present invention without departing from the scope of the invention. It is intended that the present invention include such modifications and variations as come within the scope of the appended claims and their equivalents.

The invention claimed is:

1. An apparatus for back-mixing moist material that has been spread for drying, comprising
    an axle;
    at least one shovel attached to said axle and configured for turning over the moist material, said shovel defining an outer circumference within which said shovel is rotatable about said axle; and,
    a retention device suspended proximate to said outer circumference and outside thereof, said retention device also positioned relative to said axle so as to be directly above and adjacent to the moist material when the apparatus is in use, wherein said retention device is configured to travel with said axle along the moist material to assist the shovels in retaining the moist material.

2. An apparatus as in claim 1, wherein said axle defines a direction of travel that is perpendicular to said axle, the apparatus further comprising a motor configured to move the apparatus along the direction of travel.

3. An apparatus as in claim 1, further comprising a drive to change the distance between said outer-circumference and a floor onto which the moist material has been spread.

4. An apparatus as in claim 1, further comprising an adjusting device in mechanical communication with said retention device and configured for adjusting the height at which said retention device is suspended above a floor onto which the moist material has been spread.

5. An apparatus as in claim 1, wherein said retention device comprises a screen configured for raking off the drying bed.

6. An apparatus as in claim 1, wherein said retention device comprises a flexible tab.

7. An apparatus as in claim 1, wherein said shovel comprises multiple segments attached together to form a substantially semicircle shape.

8. An apparatus as in claim 1, further comprising a support wheel connected to the apparatus and configured for allowing the apparatus to roll along a direction perpendicular to said axis.

9. An apparatus as in claim 8, further comprising a plow attached to the apparatus, positioned proximate to said support wheel, and configured for turning aside moist material as the apparatus is moved along a direction perpendicular to said axis.

10. An apparatus as in claim 8, wherein the position of said retention device along said outer circumference is adjustable so as to control materials turned over by said at least one shovel.

11. An apparatus as in claim 8, further comprising a raking device attached to the apparatus and configured for moving the moist material.

12. An apparatus as in claim 11, wherein said raking device and said suspension device are constructed as an integrated component.

13. An apparatus as in claim 11, wherein the apparatus defines a front and a back based on the direction of travel, and wherein said raking device is attached to the back of the apparatus.

14. An apparatus as in claim 13, wherein said retention device is attached to the front of the apparatus.

15. An apparatus as in claim 1, further comprising a sensor attached to the apparatus and configured for determining the height of the moist material.

16. An apparatus as in claim 15, wherein said sensor is further equipped for determining the average height of the moist material.

17. An apparatus as in claim 1, wherein said at least one shovel comprises a plurality of shovels connected along said axle.

18. An apparatus as in claim 17, wherein said shovels are offset relative to each other along the axial direction.

19. An apparatus as in claim 1, wherein said shovel can be selectively fixed at a predetermined position about said outer circumference.

20. An apparatus for back mixing moist material that has been spread for drying, the apparatus comprising:
    an axle;
    a stanchion attached to said axle;
    at least one shovel attached to said stanchion, said shovel defining an outer circumference within which said shovel is rotatable about said axle; and
    at least one retention plate attached to said axle and configured for rotational movement with said axle.

* * * * *